United States Patent

Drumm et al.

Patent Number: 6,019,439
Date of Patent: Feb. 1, 2000

[54] METHOD OF OPERATING AN ANTI-LOCKING AUTOMOTIVE VEHICLE-BRAKE SYSTEM

[75] Inventors: Stefan Drumm, Frankfurt am Main; Franciscus Van Meel, Bad Soden, both of Germany

[73] Assignee: ITT Manufacturing Enterprises Inc., Wilmington, Del.

[21] Appl. No.: 08/817,636

[22] PCT Filed: Sep. 23, 1995

[86] PCT No.: PCT/EP95/03779

§ 371 Date: Sep. 25, 1997

§ 102(e) Date: Sep. 25, 1997

[87] PCT Pub. No.: WO96/13417

PCT Pub. Date: May 9, 1996

[30] Foreign Application Priority Data

Oct. 29, 1994 [DE] Germany ............................. 44 38 722

[51] Int. Cl.[7] .................................................. B60T 13/58
[52] U.S. Cl. .......................................................... 303/114.3
[58] Field of Search .............................. 303/113.2, 113.3, 303/113.4, 114.1, 114.3; 91/369.1, 369.2

[56] References Cited

U.S. PATENT DOCUMENTS

| | | | |
|---|---|---|---|
| 5,044,702 | 9/1991 | Beck et al. | 303/114.3 |
| 5,098,170 | 3/1992 | Watanabe | 303/113.5 |
| 5,181,769 | 1/1993 | Schiel et al. | 303/114.3 |
| 5,350,225 | 9/1994 | Steiner et al. | 303/113.4 |

FOREIGN PATENT DOCUMENTS

| | | |
|---|---|---|
| 478396 | 4/1992 | European Pat. Off. . |
| 0581105 | 2/1994 | European Pat. Off. . |
| 2623458 | 5/1989 | France . |
| 2645096 | 10/1990 | France . |
| 4004249 | 8/1990 | Germany . |
| 4009640 | 6/1991 | Germany . |
| 4004065 | 8/1991 | Germany . |
| 4102496 | 2/1992 | Germany . |
| 4208496 | 8/1993 | Germany . |
| 4234041 | 3/1994 | Germany . |
| 4238333 | 5/1994 | Germany . |
| 4329140 | 12/1994 | Germany . |
| WO 9613417 | 5/1996 | WIPO . |

*Primary Examiner*—Chris Schwartz
*Attorney, Agent, or Firm*—Rader, Fishman & Grauer PLLC

[57] ABSTRACT

In a method of operating an anti-lock automotive vehicle brake system for driving stability control and/or traction slip control which includes a brake force booster operable irrespective of the driver's wish, the brake force booster, at the commencement of control, will achieve its maximum attainable boosting force irrespective of the driver's wish, and the desired wheel braking pressures are adjusted by way of the ABS hydraulic unit, and at the end of the control, the independent actuation of the brake force booster will not be deactivated until the brake force booster has been reset to its initial position by returning the pressure fluid discharged from the wheel brakes into the low-pressure accumulators.

14 Claims, 1 Drawing Sheet

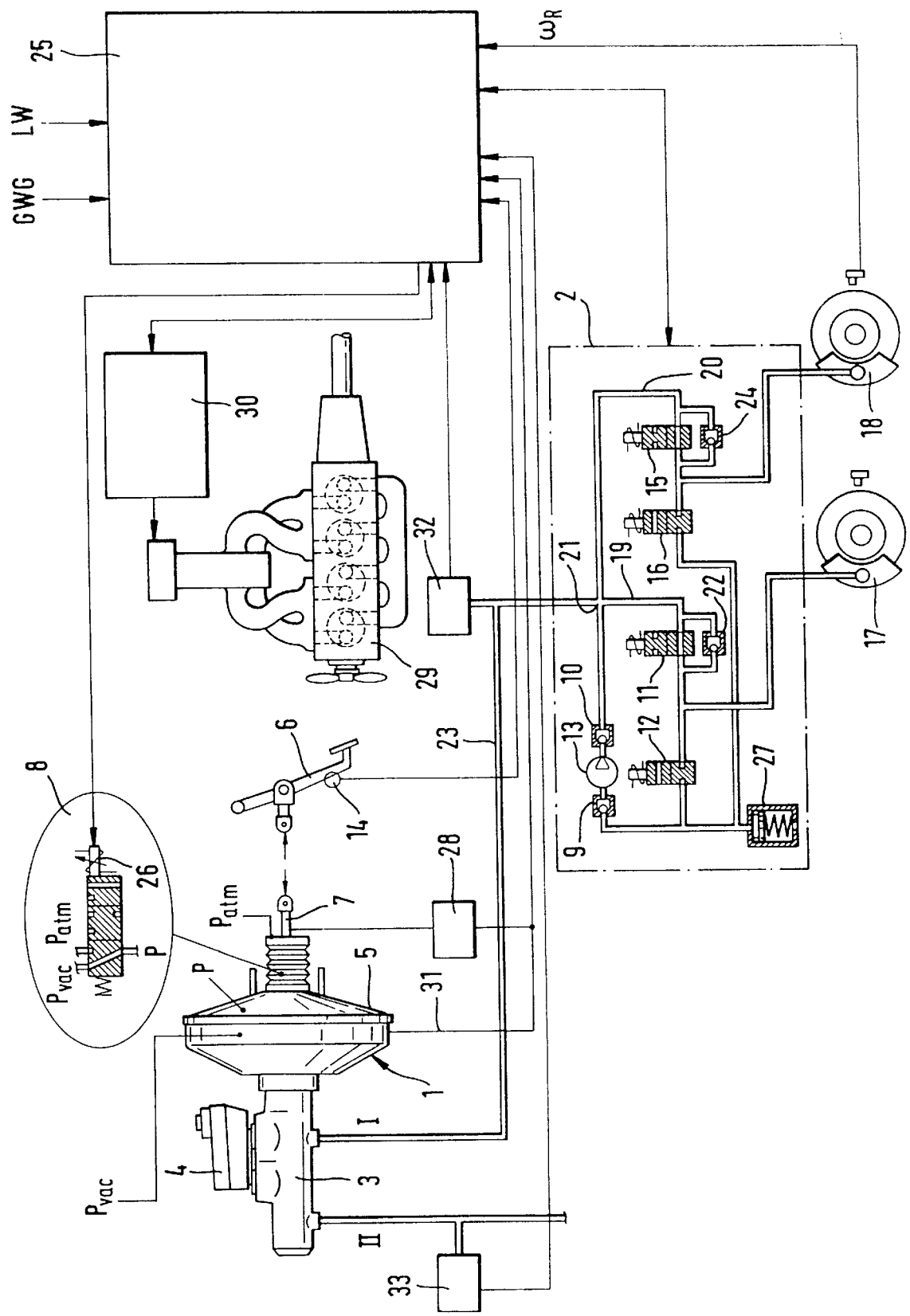

METHOD OF OPERATING AN ANTI-LOCKING AUTOMOTIVE VEHICLE-BRAKE SYSTEM

BACKGROUND OF THE INVENTION

The present invention relates to a method of operating an anti-lock automotive vehicle brake system for driving stability control and/or traction slip control which includes a pneumatic brake force booster, that is operable irrespective of the driver's wish, and a master brake cylinder connected downstream of the brake force booster and having its pressure chambers connected to wheel brakes associated with the individual vehicle wheels by way of an ABS hydraulic unit that includes return pumps and low-pressure accumulators.

German patent No. 42 08 496 discloses a brake system, wherein the brake force booster interacts with a solenoid valve to achieve automatically controlled braking operations along with a great deceleration of the vehicle. The solenoid valve permits an enhanced use of the braking pressure upon quick application of the brake pedal. A brake pedal position sensor, a brake light switch and a force sensor which permits detection of the driver's wish for deceleration are provided to achieve the above-mentioned braking pressure control concept. Further, the known brake system includes an anti-lock control system (ABS) which ensures a stable deceleration behavior of the vehicle during braking operations. A disadvantage of the brake system described in the prior art is the comparatively high consumption of vacuum volume during control operations and the fact that the availability of vacuum is not ensured.

SUMMARY OF THE INVENTION

Therefore, an object of the present invention is to disclose a method of operating an anti-lock automotive vehicle brake system of the previously mentioned type which permits minimizing the vacuum consumption during control operations.

This object is achieved according to the present invention in that, upon commencement of the control, the brake force booster has achieved the maximum attainable boosting force irrespective of the driver's wish, and the desired wheel braking pressures are adjusted by way of the ABS hydraulic unit. At the end of the control, the independent actuation of the brake force booster will not be deactivated until the brake force booster has been reset to its initial position by returning the pressure fluid discharged from the wheel brakes to the low-pressure accumulators. It is thereby achieved that the pressure balance which takes place after the deactivation between the working chamber and the vacuum chamber of the brake force booster causes only a small loss in vacuum volume or actuation energy.

In another feature of the present invention, the operation of the brake system described during a simultaneous actuation by the driver and an independent actuation is rendered possible because the actuation of the brake force booster by the driver is sensed, and the independent assist braking is correspondingly varied. An advantage of this provision results in the superposition of brake actuation by the driver and independent assist braking (irrespective of the driver) is a software arrangement and, therefore, may be configured freely in conformity to vehicle control requirements.

Using the brake force booster as the sole energy source for pressure increase limits the hydraulic structure required in the brake system described to that of a standard ABS brake system.

In another preferred aspect of the present invention, an indirect identification of the driver's wish for deceleration is ensured by determining the actuating travel of a brake pedal which actuates the brake force booster. The brake pedal is not moved when the brake force booster is actuated irrespective of the driver's wish. The established actuating travel is converted into an actuating force or a vehicle deceleration nominal value, preferably by way of a characteristic curve which is predefined or is acquired during normal braking operations. These arrangements permit the use of low-cost sensor means.

According to another preferred feature of the present invention the driver's wish for deceleration is precisely determined by sensing the actuating force which is introduced by the brake pedal.

To ensure that an additional amount of vacuum is provided during control operations, in another preferred aspect of the present invention, the vehicle engine is throttled when the value of the vacuum prevailing in the vacuum chamber of the brake force booster is too low.

Engine management is preferably effected by way of an electronically controlled acceleration device.

To obtain a standard for the available vacuum, in still another preferred feature, the present invention provides that the hydraulic pressure introduced into the master brake cylinder is continuously determined. This arrangement permits reliably monitoring the maximum attainable boosting force of the brake force booster.

To achieve redundant information about the pressure values, the pressure is determined by way of pressure sensors connected to the pressure chambers of the master cylinder according to the present invention.

The present invention will be described in detail in the following text by way of an embodiment, making reference to the accompanying drawing.

BRIEF DESCRIPTION OF THE DRAWING

In the drawing, the only FIGURE refers to a design of an anti-lock automotive vehicle brake system which permits implementing the method of the present invention.

DETAILED DESCRIPTION OF THE INVENTION

The brake system used to implement the method of the present invention, as shown, includes two brake circuits I and II having a completely identical design. Thus, the following description of one brake circuit also applies to the other brake circuit. The brake system shown generally includes a braking pressure generator 1 to which wheel brake cylinders 17, 18 are connectable by way of hydraulic lines (not referred to). Further, the brake system includes an ABS hydraulic unit 2 interposed between the braking pressure generator 1 and the wheel brakes, and an electronic controller 25 with associated sensor means (not shown). The wheel brake cylinders 17, 18 of the individual brake circuits I, II are associated such that the first wheel brake cylinder 17 either is associated with a wheel of one vehicle axle and the other wheel brake cylinder 18 is associated with the diagonally opposite wheel of the other vehicle axle (diagonal split of the brake circuits), or both wheel brake cylinders 17 and 18 are associated with the same vehicle axle (black and white brake circuit split).

The pressure generator 1, which is operable by the driver of the automotive vehicle by applying a brake pedal 6, includes a pneumatic brake force booster 5. A master brake cylinder, preferably a tandem master cylinder 3, is connected downstream of the brake force booster. The pressure chambers (not shown) of the tandem master cylinder 3 are connectable to a pressure fluid supply reservoir 4. An actuating rod 7 is coupled to the brake pedal 6 permitting the vehicle driver to actuate a control valve 8 (shown only schematically) which controls the increase of a pneumatic differential pressure in the housing of the brake force booster 5. A solenoid 26 (shown only schematically), operable by control signals of the electronic controller 25, permits an independent actuation of the control valve 8, even if the independent actuation is superimposed on an actuating force introduced at the brake pedal 6.

A brake light switch 14 which is operatively connected to the brake pedal 6 permits identifying the actuation of the brake force booster 5 by the driver or by an actuation of the solenoid 26. The brake pedal 6 is entrained and the brake light switch 14 is thereby reversed during independent actuation of the brake force booster 5. Actuation of the brake force booster 5 initiated by the driver can be identified, for example, by use of a release switch (not shown).

The ABS hydraulic unit 2 includes a motor-and-pump assembly having a hydraulic return pump 13 driven by an electric motor (not shown). The suction side of the return pump is connected to a low-pressure accumulator 27 associated with the wheel brakes 17, 18 by way of a first non-return valve 9. The pressure fluid flows from the pressure side of the return pump 13 to a hydraulic junction 21 by way of a second non-return valve 10 and a damping chamber (not shown). A line portion 19 leading to the first wheel brake cylinder 17 and a line portion 20 leading to the second wheel brake cylinder 18 is connected to junction 21. A hydraulic line 23 connects the pressure side of the return pump 13 to the tandem master cylinder 3. For the modulation of the pressure introduced into the first wheel brake cylinder 17, an inlet valve 11, connected in parallel with a third non-return valve 22, and an outlet valve 12 are used, the parallel connected valves being inserted into the line portion 19, and the outlet valve 12 permitting a connection between the first wheel brake cylinder 17 and the low-pressure accumulator 27 for a reduction of the wheel braking pressure. A second parallel connection of a second inlet valve 15 with a fourth non-return valve 24 and a second outlet valve 16 is provided to control the hydraulic pressure introduced into the second wheel brake cylinder 18 associated with the brake circuit at topic, which is similar to the wheel brake cylinder 17 referred to hereinabove. The mentioned parallel connection is arranged in the line portion 20, and the outlet valve 16 provides a connection between the second wheel brake cylinder 18 and the low-pressure accumulator 27 for the reduction of wheel braking pressure. A force sensor 28 which preferably interacts with the piston rod 7 coupled to the brake pedal 6 is used to sense the actuating force which is introduced by the driver at the brake pedal 6. The signals of the force sensor 28 are sent to the controller 25.

To identify pressure variations in the tandem master brake cylinder 3 initiated by the driver, a means to determine the master brake cylinder pressures is provided in both brake circuits I, II which, preferably, is configured as pressure sensors 32, 33 connected to the first and the second brake circuits I, II. The output signals of the sensors, along with further signals which are representative of data about the steering angle (LW), wheel rotational speeds ($\omega_R$), and the vehicle reaction, such as yaw velocity (GWG) or transverse acceleration ($\alpha_{13}$), are sent to the electronic controller 25.

Further, the electronic controller 25 is furnished with data about the condition of the brake force booster 5, such as the travel of its movable wall, by way of signal line 31.

During normal braking operations, pressure increase and pressure reduction in the wheel brake cylinders 17, 18 can be effected by a corresponding operation of the braking pressure generator 1 by way of the open inlet valves 11, 15.

The return pump 13 is started during ABS control operations in an imminent locked condition of the wheel associated with the wheel brake 17, for example. The pressure is modulated by correspondingly switching the inlet and outlet valves 11 and 12, and the pressure fluid discharged into the low-pressure accumulator 27 is returned by the return pump 13 until the pressure level of the master brake cylinder is reached.

Upon commencement of each independent assist braking operation, the brake force booster 5 is actuated by the solenoid 26, irrespective of the driver's wish, until the maximum attainable boosting force is achieved.

The required braking pressure values on each individual wheel are adjusted by the ABS valves 11, 12, 15, and 16. Pressure fluid which is not required is returned by the return pump 13 into the master brake cylinder 3. No vacuum is consumed in this event. During independent assist braking, a potential wish of the driver to brake is taken into account by sensing the pedal actuation (force and/or travel) and by correspondingly varied independent assist braking pressures. When braking initiated by the driver and independent assist braking is terminated, and all braking pressures are at zero, the return pump 13 will have readjusted the vacuum volume of the brake force booster 5 to the value which it had at the commencement of the control. Vacuum volume will be consumed only when the independent actuation of the brake force booster 5 is deactivated and the working chamber of the booster, which is ventilated with atmospheric pressure for the independent assist braking operation, is connected to the vacuum chamber to make the brake force booster adopt its release position.

In this arrangement, it is particularly appropriate that the working chamber of the brake force booster 5 has a minimum possible volume in the release position. It is achieved thereby that the pressure balance between the working chamber and vacuum chamber, which occurred after the deactivation of the independent actuation of the brake force booster 5, causes only a small loss in vacuum so that still sufficient vacuum remains available for another independent assist braking operation or for braking initiated by the driver. When independent assist braking starts with an insufficient vacuum level in the vacuum chamber of the brake force booster 5, the electromagnetic controller 25, in conjunction with an engine controller 30, must throttle the vehicle engine 29, for example, by an electronically controlled acceleration device. The possibility of intervening in drive management must be provided so that the control, if necessary, can correct any driver's wish for acceleration which is not in conformity with the present driving situation.

We claim:

1. A method of operating an anti-lock automotive vehicle brake system for driving stability control and/or traction slip control which includes a pneumatic brake force booster that is operable irrespective of the driver's wish and a master brake cylinder connected downstream of the brake force booster and having its pressure chambers connected to wheel brakes associated with the individual vehicle wheels by way of an ABS hydraulic unit including return pumps and low-pressure accumulators, wherein, upon commencement of the control, the brake force booster has achieved its maximum attainable boosting force irrespective of the driver's wish, and the desired wheel braking pressures are adjusted by way of the ABS hydraulic unit, wherein, at the end of the control, the independent actuation of the brake force booster will be deactivated only after the vacuum volume of the brake force booster has been reset to the value it had at the commencement of the control by returning the pressure fluid discharged from the wheel brakes to the low-pressure accumulators.

2. The method as claimed in claim 1, wherein the actuation of the brake force booster by the driver is sensed.

3. The method as claimed in claim 2, wherein the actuating travel of a brake pedal which actuates the brake force booster is determined, and the brake pedal is not moved when the brake force booster is actuated irrespective of the driver's wish.

4. The method as claimed in claim 3, wherein the determined actuating travel is converted into an actuating force or a vehicle deceleration nominal value by way of a characteristic curve which is predefined or is acquired during normal braking operations.

5. The method as claimed in claim 2, wherein the actuating force which is introduced by the brake pedal is sensed.

6. The method as claimed in claim 1, wherein the vehicle engine is throttled when the value of the vacuum prevailing in the vacuum chamber of the brake force booster is too low.

7. The method as claimed in claim 6, wherein the hydraulic pressure introduced into the master brake cylinder is continuously determined.

8. A method of operating an anti-lock automotive vehicle brake system for driving stability control and/or traction slip control which includes a pneumatic vacuum brake force booster that is operable irrespective of the driver's wish with a brake-pedal operated control valve and a master brake cylinder connected downstream of the vacuum brake force booster and having its pressure chambers connected to wheel brakes associated with the individual vehicle wheels by way of an ABS hydraulic unit including return pumps and low-pressure accumulators, wherein, upon commencement of driving stability control and/or traction slip control, the vacuum brake force booster has achieved its maximum attainable boosting force irrespective of the driver's wish, and the desired wheel braking pressures are adjusted by way of the ABS hydraulic unit, and, at the end of driving stability control and/or traction slip control, the actuation of the vacuum brake force booster irrespective of the driver's wish will be deactivated only after the pressure fluid discharged from the wheel brakes to the low-pressure accumulators has been returned to the master brake cylinder.

9. The method as claimed in claim 8, wherein the actuation of the control valve of the vacuum brake force booster by the driver is sensed.

10. The method as claimed in claim 9, wherein the actuating travel of a brake pedal which actuates the vacuum brake force booster is determined, and the brake pedal is not moved when the vacuum brake force booster is actuated irrespective of the driver's wish.

11. The method as claimed in claim 10, wherein the determined actuating travel is converted into an actuating force or a vehicle deceleration nominal value by way of a characteristic curve which is predefined or is acquired during normal braking operations.

12. The method as claimed in claim 9, wherein the actuating force which is introduced by the brake pedal is sensed.

13. The method as claimed in claim 8, wherein the vehicle engine is throttled when the value of the vacuum prevailing in the vacuum chamber of the vacuum brake force booster is too low.

14. The method as claimed in claim 13, wherein the hydraulic pressure introduced into the master brake cylinder is continuously determined.

* * * * *